United States Patent
Hashimoto et al.

(10) Patent No.: US 6,811,505 B2
(45) Date of Patent: Nov. 2, 2004

(54) HYDRAULIC TENSIONER

(75) Inventors: Hiroshi Hashimoto, Osaka (JP); Hiroyuki Miyake, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 11 days.

(21) Appl. No.: 10/044,651

(22) Filed: Jan. 10, 2002

(65) Prior Publication Data

US 2002/0098932 A1 Jul. 25, 2002

(30) Foreign Application Priority Data

Jan. 10, 2001 (JP) .......... 2001-002724

(51) Int. Cl.[7] .......... F16H 7/08; F16H 7/22
(52) U.S. Cl. .......... 474/110; 474/109
(58) Field of Search .......... 474/110, 111, 474/104, 101, 136, 135

(56) References Cited

U.S. PATENT DOCUMENTS

| | | | | |
|---|---|---|---|---|
| 4,674,996 A | * | 6/1987 | Anno et al. | 474/110 |
| 4,874,352 A | * | 10/1989 | Suzuki | 474/110 |
| 4,881,927 A | * | 11/1989 | Suzuki | 474/110 |
| 4,940,447 A | * | 7/1990 | Kawashima et al. | 474/110 |
| 5,637,047 A | | 6/1997 | Schulze | |
| 5,702,317 A | * | 12/1997 | Kawashima et al. | 474/110 |
| 5,908,363 A | * | 6/1999 | Suzuki | 474/109 |
| 5,913,742 A | * | 6/1999 | Nakamura et al. | 474/110 |
| 5,967,923 A | * | 10/1999 | Petri | 474/138 |
| 6,120,402 A | * | 9/2000 | Preston et al. | 474/109 |
| 6,193,623 B1 | * | 2/2001 | Koch et al. | 474/110 |
| 6,322,468 B1 | * | 11/2001 | Wing et al. | 474/110 |
| 6,361,458 B1 | * | 3/2002 | Smith | 474/109 |
| 6,471,611 B1 | * | 10/2002 | Hotta et al. | 474/109 |

FOREIGN PATENT DOCUMENTS

| | | | | |
|---|---|---|---|---|
| DE | 4035823 C1 | * | 12/1991 | F02B/67/06 |
| DE | 195 38 401 A | | 12/1996 | |
| DE | 19631607 A1 | * | 2/1998 | F16H/7/08 |
| DE | 100 07 478 A1 | | 8/2000 | |
| DE | 2803005 A1 | * | 6/2001 | F16H/7/08 |
| DE | 10011195 A1 | * | 9/2001 | F16H/7/08 |
| EP | 0409460 A2 | * | 1/1994 | 474/110 |
| EP | 0 908 646 A | | 4/1999 | |
| EP | 0 916 869 A2 | | 5/1999 | |
| EP | 0 952 375 A2 | | 10/1999 | |
| JP | 05-321994 A | * | 12/1993 | 474/110 |
| JP | 2000-329204 A | * | 11/2000 | F16H/7/08 |
| JP | 2000-346152 | | 12/2000 | |
| JP | 2001289290 A | * | 10/2001 | F16H/7/08 |
| WO | 98 05883 A | | 12/1998 | |

* cited by examiner

Primary Examiner—Marcus Charles
(74) Attorney, Agent, or Firm—Dann, Dorfman, Herrell and Skillman; Henry H. Skillman

(57) ABSTRACT

A low cost hydraulic tensioner of die-casting metal or synthetic resin with a separate metallic cylinder free from dropping out of the cylinder and fine surface finishing, is provided. The tensioner 1 comprises a metallic cylinder 4 fitted to a cylindrical hole 3 formed in a body 2, a plunger 5 energized by a spring 7 and a pressure oil chamber 8 formed between the inner part of plunger 5 and the cylinder 4. The cylinder 4 is provided with a bottom plate 4B having a through hole 4A allowing the inflow of oil. The bottom plate 4B is prevented from dropping out from the body 2 by being engaged by the spring 7.

7 Claims, 5 Drawing Sheets

HYDRAULIC TENSIONER

BACKGROUND OF THE INVENTION

1. Field of the Invention

This invention relates to a hydraulic tensioner for imparting a proper tension to a traveling chain, belt or the like, and particularly to a hydraulic tensioner in which the dropping-out of a metallic cylinder fitted into a cylindrical hole formed in the body of the tensioner is prevented by use of a compression spring provided so as to protrude the tip of a plunger from the body without fixing the cylinder by a separate fixing member or the like.

2. Description of the Prior Art

FIG. 6 shows a conventional hydraulic tensioner 51 as an example. This hydraulic tensioner 51 comprises an iron-based plunger 54 slidably fitted into a cylinder chamber 53 formed in an iron-made or aluminum alloy-made body 52.

A hollow part 55 opened at the lower end is formed within the plunger 54, and a compression spring 56 for energizing the plunger 54 to impart a proper tension to a chain, belt or the like (not shown) is housed in the hollow part 55. A pressure oil chamber 57 is formed by the hollow part 55 and the cylinder chamber 53 of the body 52, and a check valve 58 allowing the inflow of oil to the pressure oil chamber 57 but arresting the back flow thereof is provided on the bottom of the pressure oil chamber 57.

The check valve 58 is formed of a ball seat 59 pressed into a cylindrical hole 63 in the lower part of the pressure oil chamber 57, a check ball 61 provided on the upper part of the through-hole 60 of the ball seat 59, a coil spring for energizing the check ball 61 toward the through-hole 60, and a retainer 62 for supporting the end of the coil spring, and the check ball 61 functions as check valve.

The pressure oil chamber 57 is regularly filled with the oil externally supplied from an inlet port 64 and the through-hole 60 by a pump or the like through the check valve 58. When the traveling chain, belt or the like gets loose, the plunger 54 regularly energized by the compression spring 56 is protruded, and the check valve 58 is opened to allow the oil to flow into the pressure oil chamber 57. When the plunger 54 is pushed into the cylinder chamber 53 by an impact force worked from the chain, belt or the like to the tensioner, the oil pressure in the pressure oil chamber 57 is raised to close the check valve 58.

When the check valve 58 is closed, the oil in the pressure oil chamber 57 is released from the lower end of the plunger 54 through a clearance (slight space) between the outer surface of the plunger 54 and the inside surface of the cylinder chamber 53 and discharged to the outside. At this time, the impact energy is absorbed by the flowing resistance of the oil passing through the clearance, and a cushion effect can be obtained.

However, since the body 52 consists of a die cast product of cast iron or aluminum alloy, the conventional hydraulic tensioner 51 has the problem of requiring film formation by coating, smoothing treatment, machining or the like to ensure the surface precision or durability of the cylinder chamber for sliding the plunger for the purpose of preventing the wear and seizure of the plunger. Further, it requires an improvement in precision of the cylindrical hole 63 since the ball seat 59 constituting the check valve 58 is pressed into the cylindrical hole 63 formed in the lower part of the pressure oil chamber 57, which causes the problem of requiring the machining therefor.

When the surface precision and durability of the cylinder chamber is inferior as described above, it is also proposed to clearance-fit a metallic cylinder of separate part into the cylindrical hole formed in the body (Japanese Patent Application Laid-Open No. 2000-346152). In this case, however, it is necessary to form an annular recessed groove on the inside surface of the cylindrical hole and mount a snap ring on the recessed groove for the prevention of dropping-out of the cylinder, resulting in the necessity of processes for groove formation, snap ring mounting and the like, which increases the manufacturing cost for this portion.

Since the body consisting of the die cast product of cast iron, aluminum alloy or the like is heavyweight, it is also considered to make the body of plastics in order to reduce the weight. However, the insert molding of a reinforcing part such as metallic cylinder or the like is required because of the presence of problems such as insufficient durability of the sliding surface with the plunger, insufficient strength of each part or the like, causing the problem of complicating a metal mold to increase the cost. Further, a looseness is caused in a temperature rise by the difference in thermal expansion coefficient with a press-in member such as the ball seat of the check valve, so that high-pressure oil cannot be supplied to the pressure oil chamber.

SUMMARY OF THE INVENTION

In order to solve the problems of the prior arts as described above, this invention has objects to facilitate the mounting of a cylinder and the assembling of a tensioner by dispensing with the film formation, smoothing treatment, machining or the like of a cylinder chamber for sliding a plunger on the body of the tensioner and also dispensing with machining of hole surface or the like in the fitting of the metallic cylinder of separate article, and to prevent the dropping-out of the cylinder by use of a compression spring provided so as to protrude the plunger from the body without requiring any cylinder fastener such as snap ring of separate member. Further, it has objects to prevent also the dropping-out of a check valve mechanism by use of the bottom plate of the cylinder in the mounting of the check valve mechanism and to facilitate the assembling thereof.

In order to attain the above objects, a hydraulic tensioner according to a first aspect of this invention comprises a metallic cylinder fitted to a cylindrical hole formed in a body, a plunger provided within the cylinder so as to be energized by a compression spring to protrude the tip from the body, and a pressure oil chamber formed between the inner part of the plunger and the cylinder, wherein the cylinder is provided with a bottom plate having a through-hole allowing the inflow of oil in the center, and the bottom plate is prevented from dropping out from the body by being energized by the compression spring.

According to a second aspect of this invention, in the hydraulic tensioner of the first aspect, the cylindrical hole is provided with a cylindrical hole smaller in diameter than this cylindrical hole on the bottom side, and a check valve mechanism fitted to the minor diameter cylindrical hole is prevented from dropping out by the abutment on the bottom plate of the cylinder.

According to a third aspect of this invention, a hydraulic tensioner comprising a metallic cylinder fitted to a cylindrical hole formed in a body, a plunger provided within the cylinder so as to be energized by a compression spring to protrude the tip from the body, a pressure oil chamber formed between the inner part of the plunger and the cylinder, and a check valve mechanism allowing the inflow of oil to the pressure oil chamber but arresting the back flow thereof, wherein the cylinder is provided with a bottom plate having a through hole allowing the inflow of oil in the center, and the bottom plate being prevented from dropping out from the body by being energized by the compression spring, the check valve mechanism comprises a check ball provided so as to block an inflow hole of oil to the pressure oil chamber from above and a spring for energizing the check ball and the spring is supported by the bottom plate, is provided.

Further, according to a fourth aspect of this invention, a hydraulic tensioner according to the third aspect, wherein the check valve mechanism further comprises a lid for supporting the spring and being a preliminary assembled product, and the lid is supported by the bottom plate, is provided.

A hydraulic tensioner according to a fifth aspect of this invention comprises a metallic cylinder fitted to a cylindrical hole formed in a body, a plunger provided within the cylinder so as to be energized by a compression spring to protrude the tip from the body, a pressure oil chamber formed between the inner part of the plunger and the cylinder, and a check valve mechanism allowing the inflow of oil to the pressure oil chamber but arresting the back flow thereof, wherein the cylinder is provided with a bottom plate having a through-hole allowing the inflow of oil in the center, the bottom plate is prevented from dropping out from the body by being energized by the compression spring through the retainer of the check valve mechanism, and the check valve mechanism comprises a check ball provided so as to block the through-hole formed in the bottom plate from above, a spring for energizing the check ball, and the retainer for supporting the spring.

According to a sixth aspect of this invention, in a hydraulic tensioner according to any one of the preceding aspects, a ratchet pawl body to be engaged with a ratchet tooth engraved in the outside surface of the plunger is rockably provided on the body by spring energization in order to prevent the backward displacement of the plunger, a cutout for rocking the ratchet pawl body engageably with the ratchet tooth and a pair of protruding pieces extending outward from the end of the cutout are formed on the cylinder, and the ratchet pawl body is supported through a shaft inserted to mount holes formed in the protruding pieces and a mount hole formed in the body.

According to a seventh aspect of this invention, a hydraulic tensioner according to any one of the preceding aspects, wherein the body is made by die-casting and the cylinder is made of steel iron, is provided.

Moreover, according to an eighth aspect of this invention, a hydraulic tensioner according to any one of the preceding aspects, wherein the body is made by synthetic resin molding and the cylinder is made of steel iron.

In this invention, the body may consist of a die cast product of cast iron, aluminum, aluminum alloy, a plastic product or the like without specially limiting the material thereof. As the cylinder, any metallic cylinder of steel iron, cast iron, sintered metal or the like can be used if it never causes a seizure with the plunger without specially limiting the material thereof.

When the hydraulic tensioner of this invention is mounted on an engine, a drive unit or the like, the compression spring energizes the bottom plate of the cylinder since the plunger provided so as to protrude the tip from the body of the tensioner is pressed by a chain, belt or the like and pushed so as to retreat into the cylinder, and the dropping-out of the cylinder can be thus prevented without separately providing any fastener. The thus-prevention of dropping-out of the bottom plate of the cylinder by the compression spring allows the clearance fit of the cylinder. When the die cast product of cast iron, aluminum, aluminum alloy or the like or the plastic product by synthetic resin molding is used as the body, the cylindrical hole for fitting the cylinder requires no surface treatment, machining or the like, and the surface treatment, machining or the like of the mounting surface to the engine, drive unit or the like is also dispensed with in the use of the plastic product.

DESCRIPTION OF THE PREFERRED EMBODIMENT

Figure 1:
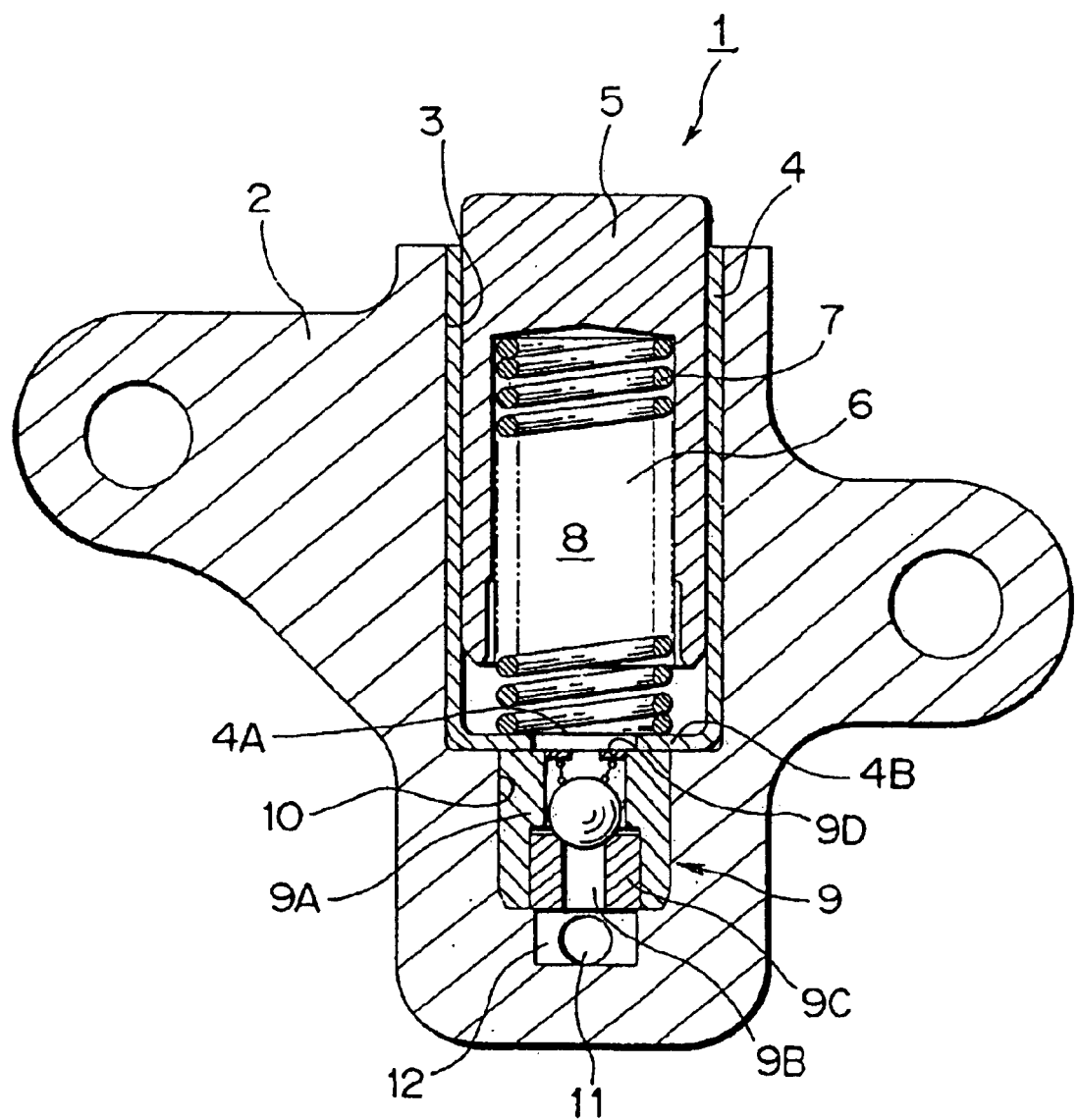
FIG. 1 is a sectional view of a tensioner according to Example 1 of this invention.

A preferred embodiment of this invention is described on the basis of Example 1 in reference to FIG. 1. FIG. 1 shows a section of a hydraulic tensioner 1, and the tensioner 1 comprises a steel iron-made cylinder 4 fitted to a cylindrical hole 3 formed in a body 2 and a plunger 5 slidably inserted into the cylinder 4. In this case, the cylinder may be clearance-fitted. The cylindrical hole 3 is provided with a cylindrical hole 10 smaller in diameter than this cylindrical hole on the bottom side. The cylinder 4 is provided with a bottom plate 4B having a through-hole 4A communicating with a check valve mechanism 9 described later in the center.

A hollow part 6 opened at the lower end is formed within the plunger 5, and a compression spring 7 for protruding the tip of the plunger 5 to impart a proper tension to a chain, belt or the like is housed in the hollow part 6. A pressure oil chamber 8 is formed by the hollow part 6 and the inner part of the cylinder 4, and the check valve mechanism 9 allowing the inflow of oil to the pressure oil chamber 8 but arresting the back flow thereof is provided at the bottom of the pressure oil chamber 8.

The check valve mechanism 9 is a preliminarily assembled product (so-called assembly) consisting of a cylindrical block 9A, a ball seat 9C having an oil passage 9B, a check ball, a coil spring, and a lid 9D. It is fitted to the minor-diameter cylindrical hole 10 provided in the bottom side of the cylindrical hole 3 and prevented from dropping out by the abutment of its upper part on the bottom plate 4A of the cylinder 4.

The pressure oil chamber 8 is regularly filled with the oil externally supplied from an oil inlet port 11, an oil chamber 12 and the oil passage 9B by a pump or the like through the check valve mechanism 9. When the traveling chain, belt or the like gets loose, the plunger 5 regularly energized by the compression spring 7 is protruded, and the check valve mechanism 9 is also opened to allow the oil to flow into the pressure oil chamber 8. When the plunger 5 is pushed into the cylinder 4 by an impact force worked from the chain, belt or the like to the tensioner, the oil pressure in the pressure oil chamber 8 is raised to close the check valve mechanism 9.

When the thus-formed hydraulic tensioner 1 is mounted on an engine, a drive unit or the like, the compression spring 7 regularly engages the bottom plate 4A of the cylinder 4 since the plunger 5 provided so as to protrude the tip from the body 2 of the tensioner is pressed by the chain, belt or the like and pushed into the cylinder 4, and the dropping-out of the cylinder 4 can be thus prevented.

Since the prevention of dropping-out of the cylinder 4 allows the clearance fit of the cylinder 4, and the cylindrical hole 3 for fitting the cylinder 4 requires no surface treatment, machining or the like when the die cast product of cast iron, aluminum, aluminum alloy or the like or the plastic product by synthetic resin molding is used as the body 2. Since the check valve mechanism 9 fitted to the minor-diameter cylindrical hole 10 provided in the bottom side of the cylindrical hole 3 is prevented from dropping out by the abutment on the bottom plate 4A of the cylinder 4, the surface treatment, machining or the like of the minor-diameter cylindrical hole 10 is also unnecessary. Consequently, the press-in of the cylinder, the ball seat or the like is dispensed with.

Figure 2:
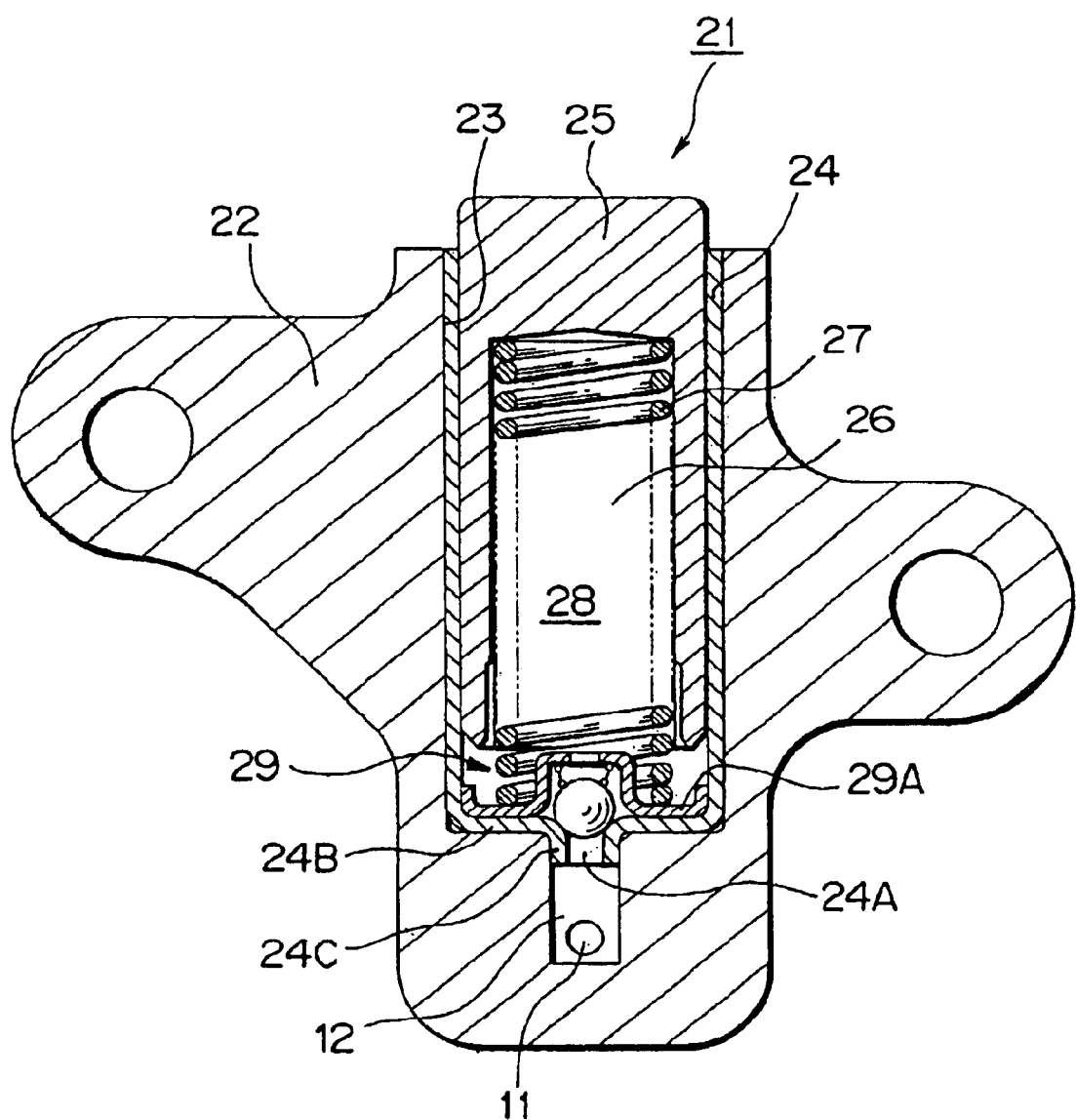
FIG. 2 is a sectional view of a tensioner according to Example 2 of this invention.

Example 2 is described on the basis of FIG. 2. For each example described below, the same reference number is imparted to the same member as in Example 1. FIG. 2 shows a section of a hydraulic tensioner 21, and the tensioner 21 comprises a steel iron-made cylinder 4 fitted to a cylindrical hole 23 formed in a body 22 and a plunger 25 slidably inserted into the cylinder 24. The cylinder 24 is provided with a bottom plate 24B having a through-hole 24A allowing the inflow of the oil constituting a check valve mechanism 29 in the center as described below.

A hollow part 26 opened at the lower end is formed within the plunger 25, and a compression spring 27 for protruding the tip of the plunger 25 is housed in the hollow part 26. A pressure oil chamber 28 is formed by the hollow part 26 and the inner part of the cylinder 24, and the check valve mechanism 29 allowing the inflow of oil to the pressure oil chamber 28 but arresting the back flow thereof is provided on the bottom of the pressure oil chamber 28. Denoted at 24C in FIG. 2 is a cylindrical member extended down from the through-hole 24A, which forms an oil passage.

The check valve mechanism 29 comprises a check ball provided so as to block the through-hole 24A formed in the bottom plate 24B of the cylinder 24 from above, a spring for energizing the check ball, and a retainer 29A for supporting the spring, and it is formed above the bottom plate 24B of the cylinder 24.

The pressure oil chamber 28 is regularly filled with the oil externally supplied from an oil inlet port 11 and an oil chamber 12 by a pump or the like through the check valve mechanism 29. When the traveling chain, belt or the like gets loose, the plunger 25 regularly energized by the compression spring 27 is protruded, and the check valve mechanism 29 is opened to allow the oil to flow into the pressure oil chamber 28. When the plunger 25 is pushed into the cylinder 24 by an impact force worked from the chain, belt or the like to the tensioner, the oil pressure in the pressure oil chamber 28 is raised to close the check valve mechanism 29.

When the thus-formed hydraulic tensioner 21 is mounted on an engine, a drive unit or the like, the compression spring 27 regularly energizes the bottom plate 24B of the cylinder 24 through the retainer 29A of the check valve mechanism 29 since the plunger 25 provided so as to protrude the tip from the body 22 of the tensioner is pressed by the chain, belt or the like and pushed into the cylinder 24, and the dropping-out of the cylinder 24 can be thus prevented.

Figure 3:
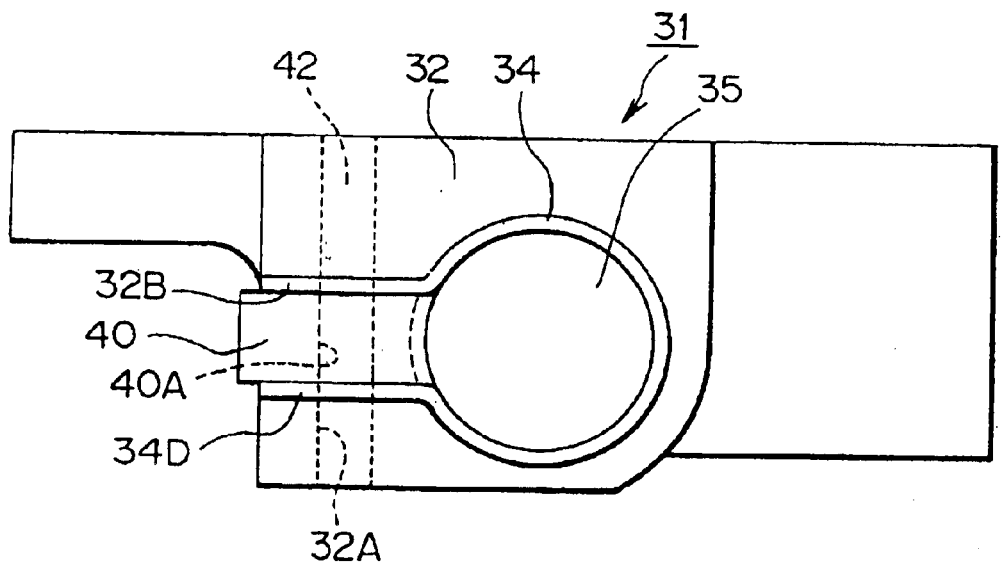
FIG. 3 is a plan view of a tensioner according to Example 3 of this invention.
Figure 4:
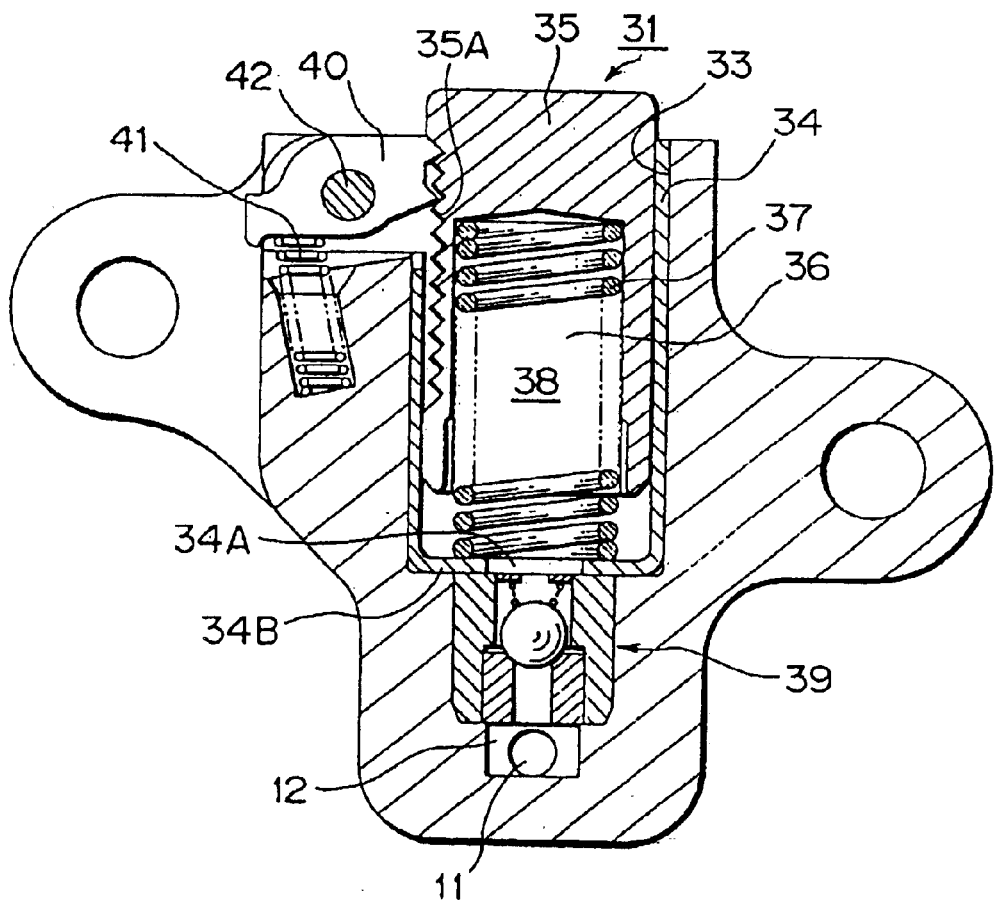
FIG. 4 is a sectional view of the tensioner of FIG. 3
Figure 5:
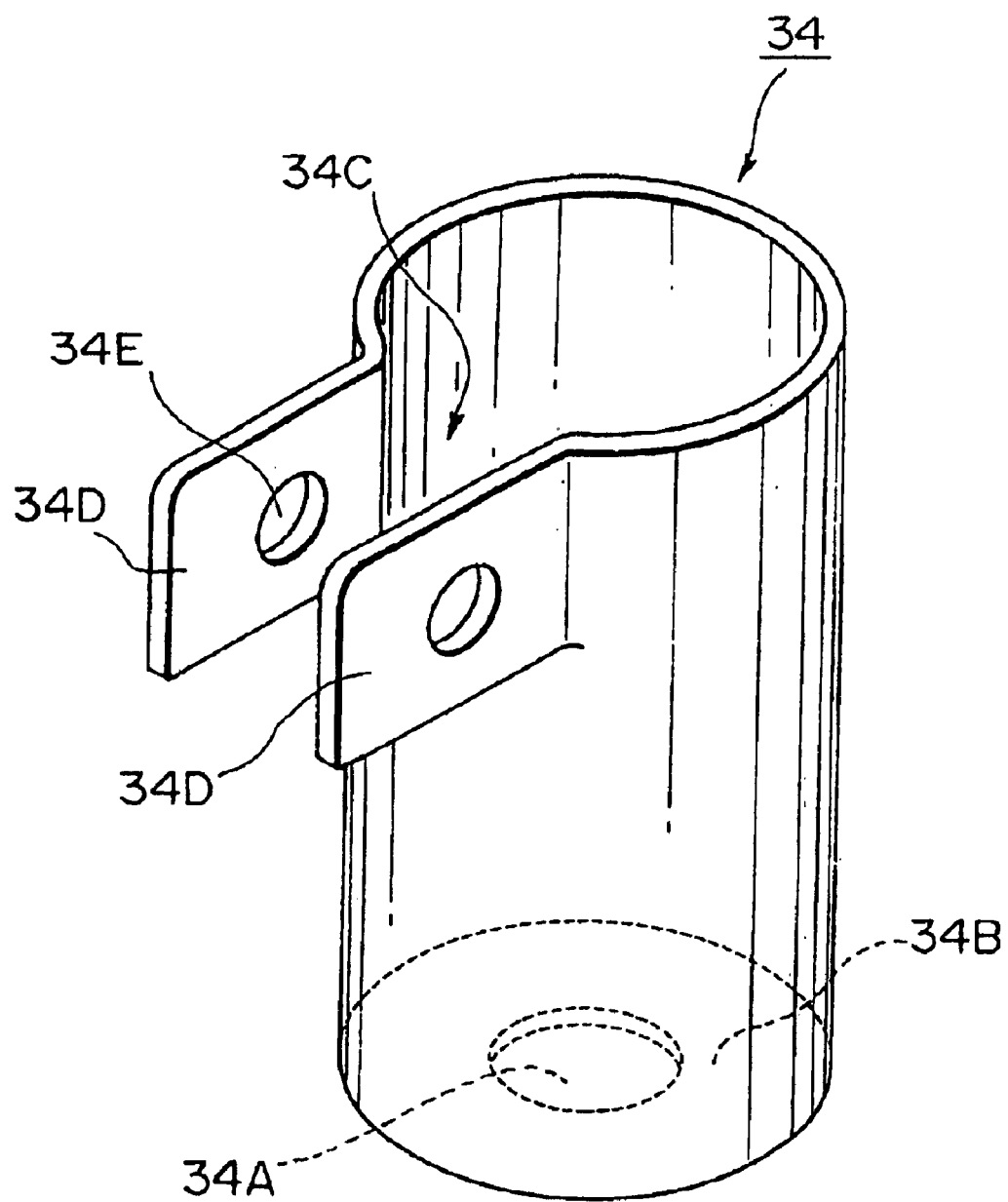
FIG. 5 is a perspective view of the tensioner of FIG. 3.
Figure 6:
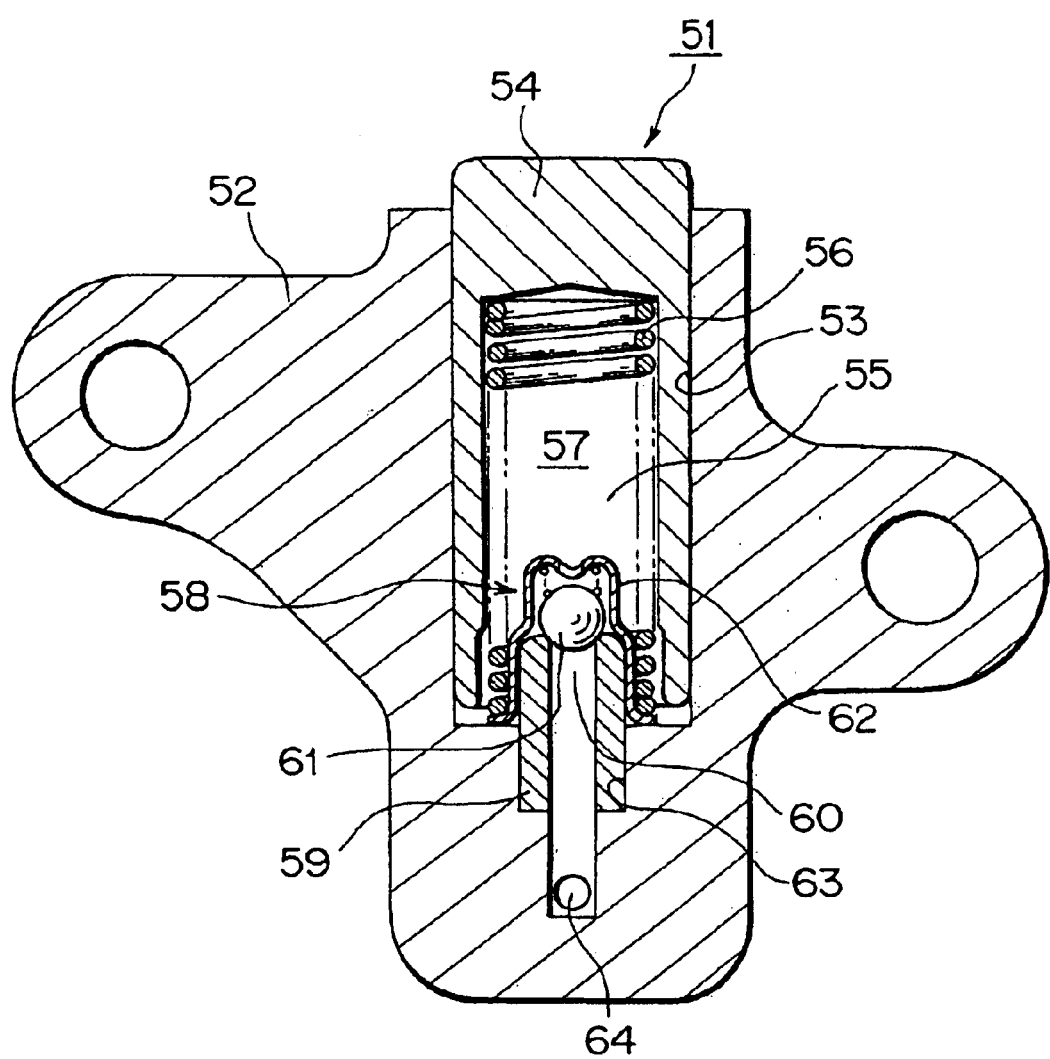
FIG. 6 is a sectional view of a conventional tensioner.

Example 3 is described on the basis of FIGS. 3-5. A hydraulic tensioner 31 of Example 3 consists of the hydraulic tensioner of Example 1 provided with a backward displacement preventing means for plunger in which a ratchet pawl pivotally fixed to the body is engaged with a ratchet tooth engraved in the plunger as described below in detail. FIG. 4 shows a section of the hydraulic tensioner 31, and the tensioner 31 comprises a steel ironmade cylinder 34 clearance-fitted to a cylindrical hole 33 formed in a plastic body 32, and a plunger 35 slidably inserted into the cylinder 34.

A hollow part 36 opened at the lower end is formed within the plunger 35, and a compression spring 37 for protruding the tip of the plunger 35 is housed in the hollow part 36. A pressure oil chamber 38 is formed by the hollow part 36 and the inner part of the cylinder 34, and a check valve mechanism 39 allowing the inflow of oil to the pressure oil chamber 38 but arresting the back flow thereof is provided on the bottom of the pressure oil chamber 38.

The check valve mechanism 39 has the same structure as the check valve mechanism 9 and mounting means as Example 1, and consists of a preliminarily assembled product consisting of a cylindrical block, a ball seat having an oil passage, a check ball, a coil spring and a lid. It is fitted into a cylindrical hole smaller in diameter than the cylindrical hole 33 further formed in the bottom of the cylindrical hole 33.

A recessed groove 32B communicating with the cylindrical hole 33 is formed in the body 32, and a ratchet pawl body 40 to be engaged with a ratchet tooth 35A engraved in the outside surface of the plunger 35 is rockably provided within the recessed groove while being energized by a ratchet spring 41 in order to prevent the backward movement of the plunger 35. In this case, a backlash is provided between the ratchet tooth 35A and the pawl of the ratchet pawl body 40.

The cylinder 34 comprises a bottom plate 34B having a through-hole 34A communicating with a check valve mechanism 39 described below in the center. Further, as shown in FIGS. 3 and 5, the cylinder 34 comprises a cutout 34C for rocking the ratchet pawl body 40 engageably with the ratchet tooth 35A of the plunger 35, and a pair of protruding pieces 34D and 34D extending outward from the end of the cutout 34C. The ratchet pawl body 40 is inserted to mount holes 34E formed in the protruding pieces 34D and a mount hole 32A formed in the body 32, and supported through a shaft hole 40 by a shaft 42 inserted to the mount hole 32A.

The action of the hydraulic tensioner 31 is as follows. The pressure oil chamber 38 is regularly filled with the oil externally supplied from the oil inlet port 11, the oil chamber 12 and the oil passage by a pump or the like through the check valve mechanism 39. When the traveling chain, belt or the like gets loose, the plunger 35 regularly energized by the compression spring 37 is protruded, and the check valve mechanism 39 is opened to allow the oil to flow into the pressure oil chamber 38.

When the plunger 35 is pushed into the cylinder 34 against the energizing force of the compression spring 37 by an impact worked from the chain, belt or the like to the tensioner, the plunger 35 is retreated within the range of the backlash while the ratchet tooth 35A is slid on the pawl of the ratchet pawl body 40, the oil pressure in the pressure oil chamber 38 is raised to close the check valve mechanism 39, and the impact is moderated. In this case, the engagement of the ratchet tooth 35A with the pawl of the ratchet pawl body 40 prevents the plunger 35 from retreating more required.

When the chain, belt or the like is elongated by a long-term operation, and the plunger 35 is protruded from the body 32 exceeding the range of the backlash, the check valve mechanism 39 is opened to supply the oil to the pressure oil chamber 38 through the inlet port 11, and the engagement of the ratchet tooth 35A of the plunger 36 with the pawl of the ratchet pawl body 40 is also shifted by one tooth, so that the plunger 36 is regularly moved outward the body 32 following the elongation of the belt or chain.

In the thus-constituted hydraulic tensioner 31, since the plunger is pressed by the chain, belt or the like and pushed so as to retreat into the cylinder, the bottom plate of the cylinder is engaged downward by the compression spring, and protruding pieces 34D formed on the cylinder 34 are also fixed to a mount hole 32A formed in the body 32 through a shaft 42. Accordingly, the dropping-out from the cylindrical hole 33 formed in the body 32 can be prevented.

Since the shaft 42 for supporting the ratchet pawl body 40 is inserted to the mount holes 34E of the protruding pieces 34D of the steel iron-made cylinder 34, the shaft 42 can be particularly advantageously supported, when the body 32 is made of plastics, aluminum alloy or the like inferior in strength, by the steel iron-made protruding pieces 34D without breaking the mount hole 32A of the body 32. Since the dropping-out of the cylinder 34 is prevented in this way, surface precision or pore diameter precision is not needed for the cylindrical hole for fitting the cylinder, and a process of surface treatment, machining or the like can be omitted to reduce the manufacturing cost.

The hydraulic tensioner provided with the check valve mechanism is described in Examples 1–3, but the check valve mechanism is not necessarily required. Since the high-pressure oil is supplied from an oil pump to the pressure oil chamber in this case, a cushion effect can be obtained by the oil pressure within the pressure oil chamber when the plunger is pushed into the cylinder by the impact force worked from the chain, belt or the like to the tensioner.

In this invention, the wear resistance can be improved since the metallic cylinder is fitted to the cylindrical hole formed in the body as described above. Further, since the cylinder is provided with the bottom plate having the through-hole allowing the inflow of oil in the center, and the bottom plate is prevented from dropping out from the body by the compression spring for energizing the plunger, the surface precision or pore diameter precision as in the case of cylinder press-in is not needed for the cylindrical hole for fitting the cylinder, and the process of surface treatment, machining or the like can be omitted. Consequently, the mounting of the cylinder and the assembling of the tensioner can be facilitated. Further, by using the compression spring for energizing the plunger, the process for the recessed groove formation in the cylindrical hole inside surface, the snap ring mounting or the like, which was performed in the past to prevent the dropping-out of the cylinder, can be dispensed with to reduce the manufacturing cost.

Further, since the metallic cylinder is only fitted to the cylindrical hole formed in the body, parts such as cylinder, plunger and the like can be used in common even if the outer shape of the body is deformed according to the mounting position on the engine, drive unit or the like so as to be conformable to various engines only by the formation of a body of new shape, and the manufacture of various hydraulic tensioners can be consequently facilitated.

In the installation of the check valve mechanism, when the cylindrical hole is provided with a cylindrical hole smaller in diameter than this cylindrical hole on the bottom side, and the check valve mechanism is fitted into the minor-diameter cylindrical hole and prevented from dropping out by the abutment of its upper part on the bottom plate of the cylinder, the prevention of dropping-out of the check valve mechanism is performed by use of the bottom plate of the cylinder, and the surface treatment, machining or the like of the minor-diameter cylindrical hole can be consequently similarly omitted to facilitate the assembling of the tensioner. Even if a looseness is caused in a temperature rise by the difference in thermal expansion coefficient in the body formed of the die cast product of aluminum, aluminum alloy or the like or the plastic product by synthetic resin molding, high-pressure oil can be supplied to the pressure oil chamber since the dropping-out of the check valve mechanism is prevented by the abutment on the bottom plate of the cylinder, and it is unnecessary to provide another measure for preventing the dropping-out of the check valve mechanism.

In the use of plastics for the body in order to reduce the weight, the insert molding of the metallic cylinder is dispensed with since the metallic cylinder is only fitted to the cylindrical hole formed in the body, and a complicated metal mold can be also dispensed with to reduce the manufacturing cost.

When the check valve mechanism comprises the check ball provided so as to block the through-hole formed in the bottom plate of the cylinder from above, the spring for energizing the check ball, and the retainer for supporting the spring, the ball seat can be abolished since the cylinder has the function of the ball seat, and the cost can be reduced.

When the ratchet pawl body to be engaged with the ratchet tooth engraved in the plunger outside surface is rockably provided on the body by spring energization in order to prevent the backward displacement of the plunger, a cutout for rocking the ratchet pawl body engageably with the ratchet tooth and a pair of protruding pieces extending outward from the cutout end are formed on the cylinder, and the ratchet pawl body is supported by the shaft inserted to the mount holes formed in the protruding pieces and the mount hole formed in the body, the dropping-out of the cylinder from the cylindrical hole of the cylinder can be prevented since the bottom plate of the cylinder is engaged downward by the compression spring provided so as to protrude the plunger tip from the body and also fixed to the body by the shaft through the protruding pieces formed on the cylinder.

Further, the shaft for supporting the ratchet pawl body is also inserted to the mount holes of the protruding pieces of the metallic cylinder, whereby the breakage of the mount hole formed in the body can be prevented in the body made of plastics, aluminum alloy or the like inferior in strength since the shaft is supported by the metallic protruding pieces.

What is claimed is:

1. A hydraulic tensioner comprising a body having a cylindrical hole with a bottom at its inner end provided with an inlet hole smaller in diameter than the diameter of said cylindrical hole, and a hollow cup-shaped metallic cylinder fitted to said cylindrical hole, said hollow cylinder having a hollow cylindrical wall and a bottom plate formed as one piece with said cylinder, an external diameter corresponding to the diameter of said cylindrical hole, and said wall having an internal diameter providing an interior wall around said hollow cylinder, a plunger provided within the cylinder, and a compression spring within said internal diameter to engage said plunger and urge an outer end of the plunger to protrude from the body, the inner end of the plunger forming a pressure oil chamber within said interior wall between the inner end of the plunger and the cylinder bottom plate, said cylinder bottom plate having a through-hole allowing the inflow of oil into the inner end of said pressure chamber, said through-hole registering with said inlet hole, the outer end of said pressure chamber being closed by said plunger, and the bottom plate being prevented from dropping out from the body by said compression spring bearing against the outward surface of said bottom plate between said hollow cylindrical wall and said through-hole, and and a check valve mechanism abutting the inward surface of said bottom plate of said cylinder, fitted to the inlet hole and prevented from dropping out by the abutment on the bottom plate of said cylinder.

2. A hydraulic tensioner according to claim 1 said check valve mechanism allowing the inflow of oil to the pressure oil chamber but arresting the back flow thereof, said check valve mechanism comprising a check ball mounted to block inflow hole from above and a spring for energizing the check ball; and said spring being supported by said bottom plate.

3. A hydraulic tensioner according to claim 2, wherein said check valve mechanism further comprises a retainer supported by said bottom plate and having a top spaced from said bottom plate, said check ball and spring being supported between said top and said bottom plate.

4. A hydraulic tensioner according to claim 2, said check valve mechanism comprising a check ball mounted to engage in and block the through-hole formed in the bottom plate from above, and a retainer mounted on said bottom plate for supporting the spring.

5. A hydraulic tensioner according to claim 1 wherein a ratchet tooth is engraved in the outside surface of the plunger, and including a ratchet pawl pivoted on said body and a spring biasing said pawl toward said ratchet tooth in order to prevent the backward displacement of the plunger, a cutout in said hollow cylinder for allowing the ratchet pawl body to engage with the ratchet tooth, and a pair of protruding pieces having mount holes and extending outward from the cutout on said cylinder, and a shaft inserted in said mount holes of the protruding pieces to pivotally mount said ratchet pawl body.

6. A hydraulic tensioner according to claim 1, wherein said tensioner body is a die-cast product and said cylinder is metallic.

7. A hydraulic tensioner according to claim 1, wherein said tensioner body is a molded synthetic resin and said cylinder is metallic.

* * * * *